United States Patent Office 2,773,849
Patented Dec. 11, 1956

2,773,849

FREEZE STABILIZED LATEX COATINGS

Victor M. Willis, Chicago, Ill., assignor to The Sherwin-Williams Company, Cleveland, Ohio, a corporation of Ohio No Drawing. Application October 10, 1952,
Serial No. 314,207

5 Claims. (Cl. 260—29.7)

This invention relates to water-containing coating compositions containing polymeric organic material dispersed therein in finely divided form.

More particularly, the invention relates to a means of stabilizing emulsion polymers useful in coating compositions from breakdown due to alternate freezing and thawing of the aqueous or continuous phase.

Specifically, this invention relates to the use of chlorinated phenates in conjunction with an emulsion polymer system of the oil-in-water class. In the preferred form of the invention, use is made of monovinyl aromatic hydrocarbon units and aliphatic conjugated diolefine units polymerized together through the exercise of emulsion polymerization techniques. Addition of certain chlorinated phenates to the resultant latex contributes to the capacity of the emulsion system to resist coagulation or emulsion breakdown due to extreme variations in temperature.

Experience indicates that breakdown due to freezing and thawing of emulsion systems is indirectly related to the disperse phase, but more directly with the nature and composition of the continuous aqueous phase. From this, it is obvious that the addition of chlorinated phenates is undoubtedly also useful for the same purpose in latices formed by dispersion in water of bulk polymers after their formation. However, latex systems formed in this manner are presently of less interest for the production of commercial emulsion-type coating compositions than those formed by or through emulsion polymerization techniques.

In the past several years, the commercial importance of emulsion-type compositions for coating purposes has developed to the extent of being a major replacement for the conventional solvent-type coatings useful for finishing and redecorating interior wall areas. Freedom from solvent odor, ease of application, freedom from fire hazard and economy in use have contributed materially to consumer acceptance of emulsion-type protective and decorative coatings.

Advent of large consumer demand has meant increased inventories of finished latex emulsion paints and, in turn, has brought into focus the problem of storage and handling of water-containing materials under a variety of weather conditions. Without doubt, the greatest hazard in handling and storage of emulsion paints containing water in the continuous phase, arises from storage and handling at freezing temperatures. Often in either shipment or storage, large quantities of these materials freeze. Upon subsequent thawing, the coating composition loses fluidity and can no longer be satisfactorily applied by brushing. The lot frozen becomes a total loss. While heated warehousing and heated shipping means offer a solution, this solution is impractical over a nationwide distribution system.

It is the object of this invention to provide a method of stabilizing a paint latex emulsion polymer system against breakdown and deterioration due to alternate freezing and thawing by addition thereto of a quantity of a water-soluble phenate.

It is more specifically an object of this invention to provide a more universally useful paint latex which comprises an oil-in-water emulsion polymerization product of an aromatic vinyl compound containing a single center of unsaturation and a conjugated diolifin as the primary components containing a stabilizing amount of a water-soluble, asymmetrical, chlorinated, polysubstituted phenate.

It is the specific object of this invention to provide a pigmented, oil-in-water emulsion-type coating composition capable of depositing a continuous film when dry, containing a disperse phase comprising an emulsion polymer having at least 40 mol percent of a monovinyl aromatic hydrocarbon of the benzene series having a single center of unsaturation and between 33 and 60 mol percent of an aliphatic conjugated diolefin in chemical combination, a continuous aqueous phase containing a protective colloid and a quantity in excess of 4 parts and preferably from 6 parts to 10 parts total based on said latex solids of a water-soluble alkaline salt of an asymmetrical, chlorinated, polysubstituted phenate.

Stabilizers useful for the purposes of this invention include the water-soluble alkaline salts of chlorinated phenates selected from the group consisting of ammonia and the alkali metal salts of asymmetrical, chlorinated, polysubstituted phenols. Of these, the alkali metal salts of pentachlorophenol; 2-chloro, 4-phenyl phenol and 2,3,4,6 tetrachlorophenol are outstanding and to be preferred above all others of the general class.

Materials of the class herein described have been priorly employed in emulsion paint systems for their bacteria-static and fungistatic properties. As is well known, micro-organisms tend to thrive in aqueous systems. A study of the available literature shows that the minimum strength useful for control of fungi, etc., is about 0.001%, and in practice from general experience has been known to reach as high as 0.25% of the aqueous phase of the emulsion system.

The present invention distinguishes over the prior art usage in two particulars. Most importantly, the minimum amount of the particular water-soluble asymmetrical, chlorinated, polysubstituted phenates found effective is between 4 and 5 parts per 100 parts of latex solids. In other words, latices which normally are useless after one freeze cycle show evidences of improved emulsion stability when this amount in total of the useful class of phenates is present in the latex system. Secondly, not all fungicides and preservatives are useful for the purposes of this invention. For example, of seven related fungistatic materials of water-soluble character popularly employed for their lethal effect upon micro-organisms, only five showed beneficial effect. Of the five, only three were of commercial significance, the other two being less efficient and more costly.

On another basis for comparative purposes, about 0.25% of fungicidal additive by weight of the aqueous continuous phase is the maximum now employed in paint latex emulsions. The minimum amount useful for the purposes of this invention, based upon the weight of the aqueous phase, is always in excess of 0.75% and as far as has been determined in a variety of formulations examined, generally in excess of 0.9% and preferably from 1% to 2% by weight of the aqueous phase. Thus it can be seen that the amounts priorly employed for preservative effect and control of micro-organisms are insufficient to enhance the stability of the paint latex emulsion system when such systems are subjected to freeze and thaw cycles.

Among the compounds of related nature tested and found ineffective were the following:

Sodium orthophenyl phenate
Sodium 2-bromo 4,phenyl phenate

Sodium para phenol sulfamate
Sodium picramate
Sodium phenate
Sodium sulfocarbolate Additionally tested were two inorganic salts (e. g., sodium nitrate and ammonium sulfate) to establish conclusively that the ability of the treated paint latex emulsion to withstand freezing was not due to the well-known effect upon the freezing point caused by addition of inorganic ionic salts.

The preferred compounds and those most effective were the water-soluble alkaline salts of pentachlorophenol; 2-chloro, 4,phenyl phenol; and 2,3,4,6 tetrachlorophenol. Effective in larger quantity but to a considerably lesser degree were the water-soluble alkaline salts of 2,4,5 trichlorophenol and chloro 2,phenyl phenate. From comparison between the value of the 2,chloro,4,phenyl phenate and the latter chloro 2 phenyl phenate, it is apparent that the position of the substituent chlorine group or groups is important to the overall efficiency and effectiveness of the generally useful class of chlorinated phenates.

For the purposes of definition of the amount of additive to enhance freeze resistance, it is preferred to base the amount upon the quantity of latex solids in the particular emulsion system. Upon this basis, it is essential to use in excess of four parts total of the chlorinated phenate per 100 parts of latex solids. This includes the preservative if the preservative is one of the class of chlorinated phenates defined herein as useful for freeze stabilizing purposes. Some effect is evident at a 4½ parts level, but it allows no factor of safety and is too low an amount to be commercially reliable. From 5 parts to 8 parts of the particular phenates here described per 100 parts of latex solids is an optimum total for commercial use. As much as 20 parts have been added for test purposes without obvious adverse effect upon the quality of the paint. The latter amount is wasteful only and contributes unduly to the water-soluble salts in the final film. The upper limit of range of additive is not critical for the purposes of the invention.

The art of emulsion polymerization has reached practical utilization only recently and the patent art on the subject has been enriched tremendously since the rubber shortages of World War II. While pooling of general information by those working in the field has been generally practiced, much of the specific information on actual emulsion polymerization techniques known to specific groups in the art is still not generally available. Further, the great interest and emphasis in that art has been in the production of elastomers in bulk form for use as a replacement for rubber, e. g., in the massive form, and not for purposes of protective and decorative coatings. Presently, therefore, definitions of all the qualities and characteristics of emulsion polymers useful for coating purposes cannot be set forth as the art is very new. For this reason, the term "paint latex" is used herein to refer to emulsion polymer systems. This, for the reason that language in this art as it relates to the subject at hand is, like the art, quite undeveloped. These latices are also referred to by some who are employed in the art as "reverse rubbers" for the reason that the proportions of aromatic vinyl compound and diolefin are in reverse ratio to the usual copolymer rubbers used in massive form for the manufacturing of tires, etc.

The term "paint latex" or "reverse rubber latices," as adapted herein, refers to the concept of a dispersed phase polymer formed or polymerized in an aqueous carrier, the oil-in-water type emulsion resulting having specific physical characteristics and preferably certain chemical constituents, as herein set forth.

More specifically, the term "paint latex" or "reverse rubber latex" includes particularly, but is not known to be limited to, the products of emulsion polymerization. The emulsion polymers produced from two or more unsaturated polymerizable components in the presence of surface active agents of nonionic and anionic character as stabilizers and one or more percompounds, e. g., peroxides, persulfates, etc. as accelerators of polymerization in such manner and proportions as to form an aqueous emulsion polymer system produce the preferred latices. All of the paint latices of interest to this invention which have been examined in detail have a particle diameter of the disperse phase in excess of 0.2 micron and preferably from 0.2 to about 0.4 micron. The pH of the aqueous phase is from 7.5 to 11 and preferably from 8.0 to 10, and the water content is not more than 60%, usually from 45 to 55%, of the total weight of the emulsion polymer. A further essential characteristic of materials included in the term "paint latex" is that the latex or blend of two or more latices to qualify for paint and related coating usage and to bear the name "paint latex" shall be capable of agitation in a malted milk-type drink mixer (Drink Master Model #30, Hamilton Beach Company) at a rate of rotation of the agitator of 12,000 R. P. M. for one-half hour without showing graining, viscosity change or other characteristic evidences of emulsion breakdown. Latices not meeting the above specifications are not useful for coatings and are excluded from the scope of the term "paint latex" as used herein.

Presently, the most useful paint latices are copolymers and terpolymers comprising monovinyl aromatic hydrocarbons and aliphatic conjugated diolefines containing not more than 60 mol percent of the aliphatic conjugated diolefine. Latices within this class are described in U. S. Patents 2,498,712 and 2,479,967. The term "paint latex" includes the product of a single emulsion polymerization, or a blend of two or more emulsion polymerization products. However, to qualify as a paint latex, the single product or the blend of oil-in-water emulsion products utilized as the paint latex must be capable of depositing a continuous film from the disperse polymer containing phase. Having thus described the scope of the term "paint latex" as accurately as the present state of knowledge concerning this class of composition will allow, the term shall be understood to include all of the limitations as set forth above.

As is presently known, most of the paint latices available from commercial latex producers using emulsion polymerization techniques employ principally butadiene 1,3 as the aliphatic conjugated diolefine and styrene as the aromatic vinyl compound containing a single reactive center of unsaturation as the essential monovinyl aromatic hydrocarbon. Isoprene and vinyl toluene are illustrative of other useful combinations.

In researches toward practical paint formulations of emulsion-type coating compositions, I have found that emulsion copolymers of the butadiene-styrene class containing about 80% by weight of styrene will not deposit continuous films, but may be blended with additional quantities of emulsion polymers of the same class containing as little as 40 mol percent styrene to deposit continuous films. Emulsion polymers of the first description will generally withstand freezing and thawing without breakdown, but when combined with emulsions having a plasticizing effect to form continuous films, as with emulsion polymers of the second description, are prone to break and become useless in protective and decorative emulsion coatings. From many laboratory tests, it appears to be a general rule that when a latex is compounded suitable to deposit continuous films as is essential to a completed paint latex formulation for coating purposes, they acquire the faulty characteristic of lack of stability upon alternate freezing and thawing.

It is obvious that emulsion paints, both of the pigmented and clear class, intended for storage and shipment the year around in temperate climates are subject to freezing. Upon freezing, all of the paint latices of commerce (except for odd and inconsistent batches) tested to date break down and become valueless after several freezing and thawing cycles. Accordingly, research has been extensive to find ways of making latex coatings for paint and allied purposes stable against this natural phenomenon, for great financial losses may be suffered when shipments of material are made during severely cold weather. From general experience in this field, it has been observed that latices vary in their emulsion stability (particularly in relation to freezing) depending upon the kind and amount of ionic and non-ionic emulsifier and other materials used in their manufacture in small amount and other characteristics of the latex as are inherent in the techniques known only to the original producer. It has been observed, however, that the freeze and thaw cycle stability of the various latices commercially available is enhanced by the addition of from about 4½% to not more than about 10% of a chlorinated phenate of the class herein described based upon the paint latex solids in the coating composition, but the preferred range has been found to lie in the range of from about 5% to 8% by weight based on said latex solids content. Thus, if a paint latex will withstand one freezing and thawing cycle, the addition of a chlorinated phenate as described herein permits further cycling without deterioration, impossible without the additive.

The following examples are illustrative but not to be taken as limiting upon the scope of the improvement herein described.

EXAMPLE 1

An emulsion copolymer of commerce (Dow Chemical Company 512-K) containing 45% solids of which 40 parts were butadiene by weight and 60 parts by weight were styrene were frozen and allowed to thaw. Upon thawing, the viscosity had increased and the material coagulated to a point no longer useful.

EXAMPLE 2

Two hundred parts of the above emulsion copolymer were combined with 9 parts of sodium pentachlorophenate. The sample was alternately taken down to —10 degrees below zero F. and up to 77 degrees F. for 4 successive times. The sample showed no apparent changes in viscosity or emulsion stability and could be used to deposit a clear coating of continuous nature.

EXAMPLE 3

A second emulsion copolymer (Firestone Tire and Rubber Company F-4 latex) of commerce coming within the scope of the definition as set forth above for a paint latex contained 37 parts butadiene and 63 parts styrene by weight and was subject to freezing and thawing. Upon thawing for the first time, the emulsion was broken down so that it was no longer useful for a coating composition.

EXAMPLE 4

A 200 gram sample of the above latex (Example 3) was combined with 5 parts of sodium pentachlorophenate and subjected to freezing and thawing as in Example 3. After 4 cycles, the latex was not visibly affected and was used to deposit a clear coating on paper.

EXAMPLE 5

A third emulsion copolymer of commerce (Dow 762-K) containing 33 percent of butadiene and 67 percent of styrene by weight and meeting all of the tests of a paint latex as hereinbefore set out was subjected to a freeze and thaw cycle. After reaching room temperature, the physical nature of the emulsion was such as to be unsuited for further use in paint formulations of the emulsion type.

EXAMPLE 6

200 parts by weight of the emulsion copolymer of Example 5 were combined with 5 parts by weight of sodium 2-chloro,4-phenyl phenate. After solution of the chlorinated phenate in the aqueous continuous phase, the material was subjected to freezing and thawing without materially affecting the physical character of the emulsion system.

EXAMPLE 7

80 parts of an emulsion polymer of commerce (Dow Chemical Company 529-K) containing 80 percent styrene and 20 percent of butadiene by weight (found not to lay down a continuous film by itself) was combined with 120 parts of an emulsion polymer of commerce as decribed in Example 1 (which does deposit a continuous film). 100 parts of the mixture were frozen and thawed. Upon thawing out to room temperature, the mixed polymeric dispersions in water were found to be unsuited for coating purposes.

EXAMPLE 8

To the second aliquot portion of 100 parts of the mixture of Example 7 were added 5 parts sodium 2,3,4,6 tetrachlorophenate. After the chlorinated phenate has been dissolved in the aqueous phase, the emulsion system was subject to —10 degrees below zero F. temperatures overnight and thawed to 77 degrees F. the following day. The viscosity of the product had not been changed appreciably by the treatment and the coating laid down a continuous film on paper.

EXAMPLE 9

Same as Example 2, with the substitution of sodium 2-chloro,4-phenyl phenate for sodium pentachlorophenate. Comparable results were obtained.

EXAMPLE 10

Same as Example 4, but ammonium pentachlorophenate was substituted for sodium pentachlorophenate. The ammonium salt behaved in similar fashion to the sodium salt.

EXAMPLE 11

Example 6 was repeated, but sodium chloro 2-phenyl phenate was substituted for sodium 2-chloro,4-phenyl phenate. Laboratory tests on viscosity before and after freezing and thawing showed that the chloro 2-phenyl phenate (exact positions of substituents unknown) was effective but less effective for the purposes of the invention than that of Example 6 as evidenced by a greater viscosity increase than observed in Example 6.

EXAMPLE 12

Two quarts of two different commercial emulsion paints known to contain latex as the principal binder were purchased on the open market. The amount of volatile present was allowed to evaporate from a weighed sample of each and the percent of loss determined. This was assumed to be the total water present for purposes of experiment. Each sample was divided into aliquot portions. To one aliquot portion of each sample was added 1.5% by weight of sodium pentachlorophenate based upon the calculated amount of water by weight of the aliquot portion. After two cycles of freezing and thawing (—50 degrees F. to +75 degrees F.) the untreated samples were devoid of brushing qualities as paints. The samples treated with the addition of sodium pentachlorophenate were still capable of being applied as paints and fairly comparative with the material before testing.

The following examples are further illustrative of latex emulsion paint formulations which have been improved in each instance in their ability to withstand ultimate freezing and thawing cycles by the addition of chlorinated phenates thereto.

Stabilizer solution "A"

75 parts dried acid precipitated casein and 412 parts of water were weighed into a jacketed vessel equipped with an agitator. The temperature of the slurry was increased to 160 degrees F. after which 10 parts of sulfonated tallow and 8 parts of sodium pentachlorophenate, 5 parts of borax and 5 parts of 26 degree Baumé ammonia were added and stirred into the aqueous solution. Thereafter the temperature was increased to 170 degrees F. and held for a half hour. This solution was then drawn off for use in the preparation of some of the following examples.

*Stabilizer solution "B"*

380 parts of water and 60 parts of dried soya protein (Drackett 220 orthoprotein) were weighed into a jacketed mixing vessel. The temperature of the slurry was increased to about 150 degrees F. and 15 parts of sulfonated tallow and 8 parts of sodium orthophenylphenate, 2.5 parts of caustic soda and 7.5 parts of boric acid were added. Thereafter the temperature was increased to 165 to 175 degrees F. and held for a half hour. The prepared protein solution was drawn off for later use in the formulation of latex paints.

EXAMPLE 13

*Oil-modified latex paint*

100 parts lithopone
150 parts rutile $TiO_2$
2 parts ferrite yellow
2 parts black iron oxide
40 parts mica
65 parts clay
60 parts Lorite (75% calcium carbonate and 25% diatomaceous silica—National Lead Co.)
3 parts sodium salt of alkyl aryl sulfonate
2 parts tetra sodium pyrophosphate
175 parts soya protein solution (stabilizer solution "B")
188 parts water were thoroughly mixed together. Thereafter 45 parts of four-minute heat bodied linseed oil, 1 part of 25% lead naphthenate, 3 parts of 6% cobalt naphthenate and 4 parts of pine oil were added to the pigment slurry. After incorporation of the oils and driers, the pigment slurry was passed through a zone of high shear (e. g., a colloid mill) into a thin-down vessel. Thereafter 300 parts of a paint latex and 6 parts of sodium pentachlorophenate were mixed into the milled emulsion. The paint latex contained 200 parts of 45% solids emulsion copolymer containing approximately 60% styrene and 40% butadiene (Dow Chemical Company 512-K) and 100 parts of an emulsion copolymer containing 80% styrene and 20% butadiene (Dow Chemical Company 529K).

After three cycles of freezing and thawing, the viscosity had increased but by an amount insufficient to materially affect the application characteristics of the paint.

The control sample, containing only the phenate carried in with the protein solution had become too heavy to measure the viscosity and the grainy character of the sample after the three cycles indicated breakdown of the emulsion system.

EXAMPLE 14

*Oil-free casein stabilized latex paint*

200 parts rutile $TiO_2$
100 parts lithopone
25 parts mica
75 parts clay
2 parts tetra sodium pyrophosphate
192 parts casein solution
4 parts pine oil
112 parts water were thoroughly mixed and passed over a colloid mill to assure uniform dispersion of the pigmentary material. To the milled pigment slurry was added 425 parts of a 45% solids paint latex containing 67% styrene and 33% butadiene copolymerized by emulsion techniques (Dow Chemical Company 762K Latex). The yield was approximately 100 gallons.

The above latex emulsion paint was employed as a standard for purposes of testing a variety of related phenates to determine their effectiveness for the purposes of the invention.

Eight samples of the prepared paint were weighed out into separate containers. One was set aside as a control and was so labeled. To each of the other samples was added 5 parts per 100 parts of latex solids present therein of a water-soluble phenate. The samples were identified as follows:

| Identification | Ion added |
|---|---|
| A | 2-phenyl phenate. |
| B | 2,4,5-trichlorophenate. |
| C | chloro-2-phenyl phenate. |
| D | 2-chloro-4-phenyl phenate. |
| E | 2-bromo-4-phenyl phenate. |
| F | 2,3,4,6-tetrachlorophenate. |
| G | pentachlorophenate. |
| H | Control. |

As the addition to the various fungicidal materials altered the viscosity materially, water was added to readjust the samples to viscosities within the same general range for each sample.

The samples were subjected to alternate freezing and thawing ($-10$ degrees below zero F. to $+77$ degrees F.) for three successive cycles. It has been determined that cycling beyond three times is not materially more severe a test. That is, if the latex emulsion paint will withstand 3 cycles without deterioration, it is suitable for all practical weather tests.

At the end of each cycle, the viscosity was determined at 75 degrees F. using #4 Sherwin-Williams Cup. If the paint was too viscous to flow through the orifice of the viscosity cup, a notation T. H. was made. This notation was indication of breakdown. Very bad breakdown was further noted by the symbol G, indicating grain development, which was evidence of complete emulsion deterioration.

The data is tabulated as follows:

TABLE I

| Sample Identification | Adjusted Viscosity (Seconds) | Viscosity, Seconds After Cycle | | |
|---|---|---|---|---|
| | | 1 | 2 | 3 |
| A | 9 | 14 | T. H. G. | T. H. G. |
| B | 9 | 13 | T. H. | T. H. G. |
| C | 11 | 20 | T. H. G. | T. H. G. |
| D | 9 | 11 | 18 | 26 |
| E | 13 | T. H. | T. H. | T. H. G. |
| F | 9 | 16 | 17 | 28 |
| G | 9 | 12 | 14 | 16 |
| Control | 10 | T. H. | T. H. G. | T. H. V. G. |

An additional series of tests were run using sodium pentachlorophenate to determine the amount of the additive necessary to provide the essential stabilizing effect. As the control carries some of the additive as a fungistatic, the following table has been adjusted to read on the total amount of sodium pentachlorophenate present based on the latex solids. By "total parts" is meant the total additive per 100 parts latex solids. Three cycles of freeze and thaw were given each sample as in prior test description.

TABLE II

| Sample No. | Total Parts | Total Viscosity (Seconds) | Viscosity, Seconds After Cycle | | |
|---|---|---|---|---|---|
| | | | 1 | 2 | 3 |
| 1 | 1.7 | 20.0 | T. H. | T. H. G. | T. H. G. |
| 2 | 3.7 | 14.0 | T. H. | T. H. | T. H. |
| 3 | 4.7 | 12.0 | 11.0 | 11.0 | 21.0 |
| 4 | 5.7 | 11.0 | 9.0 | 9.0 | 10.0 |
| 5 | 6.7 | 10.0 | 9.0 | 9.0 | 9.0 |

EXAMPLE 15

Example 15 was similar to Example 14 with the substitution of a paint latex containing 60% styrene and 40% butadiene as the components of an emulsion copolymer. This latex contained approximately 45% solids (General Tire & Rubber Latex DGY15°F). 8 parts of sodium pentachlorophenate were added to the mix just before passing the paste over the colloid mill.

EXAMPLE 16

*Sodium carboxy methyl cellulose stabilized latex paint*

200 parts lithopone
55 parts rutile TiO₂
50 parts ultramarine blue
15 parts pigment green B
40 parts mica
2 parts tetra sodium pyrophosphate
5 parts sodium carboxy methyl cellulose (high viscosity)
15 parts alkylolamide emulsifying agent (Ninol Laboratory 2012A)
10 parts sodium polyacrylate (Modical VD)
45 parts sulfonated tallow (antifoam) four-minute, heat bodied linseed oil
1 parts 25% lead naphthenate
3 parts 6% cobalt naphthenate
305 parts water
4 parts pine oil The above ingredients were thoroughly mixed together and passed through a colloid mill into a reducing vessel. To the milled material was added 342 parts of a 40% solids paint latex (62% styrene—38% butadiene latex—Firestone F–4) and 6 parts sodium 2,3,4,6 tetrachlorophenate. The yield was 100 gallons of ready-to-apply emulsion paint.

The above examples are believed to illustrate fully the best mode of practicing my invention. It may be further illuminating to point out that the commercial latices available vary from batch to batch and give inconsistent results which are disconcerting particularly as to freeze stability. For example, certain latices have not been freeze stable by themselves but exhibit improved freeze resistance after pigmentation. However, upon addition of the described chlorinated phenates as stabilizers, said latices pass freeze tests both pigmented and non-pigmented. Another lot of the same latex will lack stability even after pigmentation, but upon addition of a phenate of the class described, will pass freeze stability tests. In all instances, stability against freezing and thawing cycles was improved by the method disclosed.

I claim:

1. In a pigmented oil-in-water emulsion type coating composition vehicle, the solids phase of which is capable of depositing a continuous film when dry, containing a dispersed phase consisting essentially of an emulsion polymer containing at least 40 mol per cent of a monovinyl aromatic compound of the benzene series having a single center of unsaturation and between 33 and 60 mol per cent of an aliphatic conjugated diolefine of the class consisting of butadiene and isoprene in chemical combination and a continuous aqueous phase, the improvement which comprises including in the aqueous phase thereof at least 6 parts and not more than 10 parts per hundred parts of latex solids by weight of said emulsion polymer and from 1% to not more than about 5% by weight of the total aqueous phase of a water soluble alkaline salt of an asymmetrical, polysubstituted phenate, wherein said polysubstituents are limited to chlorine and phenyl groups.

2. In a pigmented oil-in-water emulsion type coating composition vehicle the solids phase of which is capable of depositing a continuous film when dry containing a disperse phase consisting essentially of an emulsion polymer having at least 40 mol percent of a monovinyl aromatic compound of the benzene series having a single center of unsaturation and between 33 and 60 mol percent of an aliphatic conjugated diolefine of the class consisting of butadiene and isoprene in chemical combination and a continuous aqueous phase containing a protective colloid, the improvement which comprises the presence in said aqueous phase of at least 4½% but not more than about 20% based on the latex solids of said emulsion polymer and in excess of 0.9% but not more than about 5% by weight of said aqueous phase of a water-soluble alkaline salt of a chlorinated phenate selected from the group consisting of ammonia and the alkali metal salts of pentachlorophenol, 2-chloro,4-phenyl phenol and 2,3,4,6 tetrachlorophenol.

3. Same as claim 1, where the phenate is sodium pentachlorophenate.

4. Same as claim 1, where the phenate is sodium 2-chloro,4-phenyl phenate.

5. Same as claim 1, wherein the phenate is sodium 2,3,4,6 tetrachlorophenate.

References Cited in the file of this patent

UNITED STATES PATENTS

| 2,605,242 | Betts et al. | July 29, 1952 |
| 2,676,930 | McKay et al. | Apr. 27, 1954 |
| 2,687,384 | Weisberg | Aug. 24, 1954 |